(12) United States Patent
Redemann

(10) Patent No.: US 12,473,954 B2
(45) Date of Patent: Nov. 18, 2025

(54) FASTENING DEVICE FOR A DISC BRAKE WITH A SPEED SENSOR

(71) Applicant: ZF CV Systems Europe BV, Brussels (BE)

(72) Inventor: Bernward Redemann, Hockenheim (DE)

(73) Assignee: ZF CV Systems Europe BV, Brussels (BE)

( * ) Notice: Subject to any disclaimer, the term of this patent is extended or adjusted under 35 U.S.C. 154(b) by 613 days.

(21) Appl. No.: 17/883,779

(22) Filed: Aug. 9, 2022

(65) Prior Publication Data

US 2023/0047089 A1 Feb. 16, 2023

(30) Foreign Application Priority Data

Aug. 10, 2021 (EP) .................................... 21190558

(51) Int. Cl.

| F16D 66/00 | (2006.01) |
| F16D 55/00 | (2006.01) |
| F16D 55/226 | (2006.01) |
| F16D 65/00 | (2006.01) |
| G01P 3/487 | (2006.01) |

(52) U.S. Cl.
CPC ........... *F16D 66/00* (2013.01); *F16D 55/226* (2013.01); *F16D 65/0056* (2013.01); *G01P 3/487* (2013.01); *B60T 2240/00* (2013.01); *F16D 2055/0008* (2013.01); *F16D 2066/003* (2013.01)

(58) Field of Classification Search
CPC .... F16D 66/00; F16D 65/0056; F16D 55/226; F16D 2066/003; F16D 2055/0008; G01P 3/487; B60T 2240/00; B60T 8/329; B60B 27/0063; B60B 27/0068
See application file for complete search history.

(56) References Cited

U.S. PATENT DOCUMENTS 10,773,703 B2 * 9/2020 Lohberg ................ F16D 55/228
2019/0322265 A1 10/2019 Tsukamoto et al.

FOREIGN PATENT DOCUMENTS

| DE | 19932585 A1 | 1/2001 |
| DE | 102012006081 A1 | 9/2013 |
| EP | 2895763 A1 | 7/2015 |

(Continued)

OTHER PUBLICATIONS

German Patent No. DE 102004050349 to Redemann et al published on May 4, 2006.*

(Continued)

*Primary Examiner* — Pamela Rodriguez
(74) *Attorney, Agent, or Firm* — Dickinson Wright PLLC

(57) ABSTRACT

A fastening device for a vehicle disc brake having a brake carrier includes holding fixture formed in the brake carrier for receiving a speed sensor. The brake carrier includes fastening members for mounting to a flange of the vehicle. The speed sensor is used for an anti-lock braking system to detect wheel slip. The holding fixture is in the form of a bore. The bore may be formed in the strut facing the axle or in an extension of one of the fastening members of the brake carrier. The speed sensor is aligned in its extension direction axially with an exciter in or on the brake disc or in the axle. The speed sensor is attached to a cable that does not need to be guided past the vehicle flange.

20 Claims, 4 Drawing Sheets

(56) References Cited

FOREIGN PATENT DOCUMENTS

| GB | 2225398 A | 5/1990 |
|---|---|---|
| KR | 102030281 B1 | 10/2019 |
| WO | 2005092683 A1 | 10/2005 |

OTHER PUBLICATIONS

European Patent No. EP 1903241 to Borlinghaus et al published on Mar. 26, 2008.*
German Patent No. DE 102014216855 to Koss published on 20/25/2016.*
European Patent No. EP 3623656 to Redemann et al published on Mar. 18, 2020.*

* cited by examiner

FASTENING DEVICE FOR A DISC BRAKE WITH A SPEED SENSOR

FIELD

The invention relates to a fastening device of a disc brake having a speed sensor for vehicles, in particular for commercial vehicles.

BACKGROUND

Disc brakes are utilized for safely decelerating a vehicle up to a standstill or, in the case of a hazardous situation, moving the vehicle evasively by means of brake interventions. These brake interventions are carried out via an anti-lock braking system, which is also referred to as an ABS system. ABS systems monitor the slip of the wheels by way of sensors, in particular by way of speed sensors at each vehicle wheel. Slip is to be understood as the deviation of the speed (actual speed) of one or multiple driven wheel(s) as compared to a form-lockingly engaged wheel (setpoint speed). A speed sensor is arranged at each vehicle wheel in order to detect the slip. In the event that a limit of adhesion between the wheel and the roadway is exceeded, the wheel locks up or the wheel slips. Such speed sensors are usually arranged on steering knuckles of the vehicle. More precisely, the speed sensors are arranged via fastening devices on the steering knuckles of the vehicle or on the axle hubs of the vehicle and detect the rotational speed of the wheel via an exciter, which is integrated at the wheel axle in the form of a pulse ring or, for example, is integrated in the brake disc. Exciters are ferromagnetic structures, such as gearwheels or shafts, wherein the speed sensor detects the change of the magnetic flux.

Such a fastening device is disclosed in WO2005092683A1. The speed sensor is arranged outside the disc brake on the vehicle axle or the axle hub and the exciter is arranged on an inwardly directed portion of the axle hub or on the brake disc.

DE19932585A1 discloses a speed sensor, which is arranged on a mounting encompassing the disc brake, wherein the mounting is arranged on a hub carrier of the vehicle axle.

These approaches from the related art share the aspect that the speed sensor is arranged on the vehicle axle or the axle hub of the vehicle outside a disc brake via an additional fastening device. The fastening device has a bore in which the speed sensor has been pressed via a sleeve, or the speed sensor is fastened on the fastening device by way of other fixing elements, such as screws or clamps, so that the speed sensor may be brought into the correct position with respect to the exciter.

SUMMARY

The problem addressed by the invention is to provide a simple cost-reducing fastening device for a speed sensor. Another problem addressed by the invention is to provide a disc brake and a vehicle having a disc brake, including a cost-reducing fastening device having a speed sensor.

The problem is solved by way of the fastening device having a holding fixture in a brake carrier of the disc brake, the speed sensor being arranged in the holding fixture. The speed sensor is configured for detecting a rotational speed of a wheel on a vehicle axle, the speed sensor being arranged at the wheel.

The speed sensor is also known to a person skilled in the art as an ABS sensor. The speed sensor must be arranged at an established distance from an exciter designed as a ferromagnetic element or in the disc brake. A pole wheel, for example, is one type of element known as an exciter. In the case of a disc brake designed as a sliding saddle disc brake, the brake carrier is a stationary element, because the brake carrier is fixedly flange-mounted on a vehicle axle. The speed sensor, which is at least partially arranged in the brake carrier or on the brake carrier, permanently remains at a fixed distance from the exciter. The fixed distance of the speed sensor from the exciter permits a constant functional reliability and a precise measurement of a wheel speed at a vehicle axle of a vehicle. The brake carrier includes two struts arranged in parallel to a brake disc for accommodating one brake pad each, the brake pads each having two end sections in their extension direction, and the struts are connected to each other at their two end sections via two connecting elements, wherein the strut has fastening members for flange-mounting onto a vehicle axle. The struts can be designed to be continuous or interrupted in their extension direction. An additional mounting welded on a vehicle axle and designed as a fastening device is no longer necessary for the arrangement of the speed sensor. Another advantage results due to the omission of the additional mounting in that the vehicle axle can be designed to be shorter, by way of which additional installation space arises in the vehicle and costs are lowered due to material savings.

In one embodiment, the holding fixture of the fastening device is designed as a bore hole, wherein the bore hole is introduced in the brake carrier by way of a bore and/or is drilled in the brake carrier. The bore hole is an integral part of the fastening device for fixing the speed sensor on the disc brake. The holding fixture designed as a bore hole is cost-effective, since it requires no further components and the bore hole requires no further installation space within the disc brake. It is also conceivable that the holding fixture is designed as a passage opening. The passage opening is simultaneously manufactured during the manufacture of the brake carrier. A casting process, for example, may be used to manufacture the passage opening.

The speed sensor, in one embodiment, is at least partially arranged in the bore hole. The bore hole is designed to be continuous for a measurement of the wheel speed and penetrates the brake carrier, so that the speed sensor can detect a change at the exciter. A person skilled in the art understands a continuous bore to mean that the bore is not a blind hole. The bore hole may be formed in the brake carrier by way of a power drill after the casting production process. The bore hole can also be concurrently formed directly during the casting operation of the brake carrier. The bore hole is formed, in its extension direction, axially with respect to the exciter. A separate adaptation of the speed sensor is either no longer necessary or only occasionally necessary due to small deviations of the bore hole with respect to the exciter.

In one refinement, the speed sensor includes a clamping bush for installation into the fastening device. The clamping bush may be an integral part of the speed sensor. The clamping bush is designed with spring elements. The outer radius of the clamping bush is larger than the inner radius of the bore hole. The clamping bush is introduced into the bore hole by pressing the spring elements together. The spring elements clamp the speed sensor against the inner wall of the bore hole and prevent an axial displacement of the speed sensor in the direction of the brake disc or counter to the direction of the brake disc. It is also conceivable that the clamping bush at least partially includes a thread on its outer circumferential surface and the speed sensor is bolted on the brake carrier on one side by means of a nut or from both sides by means of two nuts. In addition, it is also conceivable to fix the speed sensor in the bore hole by means of a welding process. A separate arrangement of an additional bush for fixing the speed sensor is no longer necessary and, therefore, the installation of the speed sensor is reduced by one operation.

In one embodiment, the speed sensor is arranged on the strut of the fastening device facing the vehicle axle in order to reduce the speed sensor connection cable in its extension direction axially in the direction of the brake disc. In addition, a clamping of the speed sensor connection cable between the brake disc and the brake pads is avoided and the cable is less subject to the effects of heat triggered by an application of the brake disc via the brake pads.

The speed sensor in another embodiment is arranged, in its extension direction, axially in the direction of the brake disc, on an extension of the fastening member of the brake carrier. The fastening member formed with the extension is arranged on the side of the brake carrier facing the vehicle axle. The arrangement of the speed sensor on the extension of the fastening member of the brake carrier has the same advantages as the arrangement on the strut facing the vehicle axle. The speed sensor can also be advantageously variably arranged on the brake carrier such that the position of the speed sensor can be adapted to various installation situations in the vehicle and to various disc brake models.

In one refinement, the fastening device is configured such that the speed sensor of the fastening device detects the wheel speed with an exciter arranged on the brake disc. For example, the speed sensor can detect movement of the exciter arranged on the brake disc. However, the speed sensor can also detect the wheel speed with an exciter integrated in the bearing of the brake disc. The exciter is designed as a magnet encoder and, as compared to other exciters, has a very good signal quality, a low susceptibility to dirt, and saves installation space.

In one refinement, the fastening device designed as a brake carrier is configured such that the speed sensor detects the wheel speed with an exciter arranged on the vehicle axle and designed as a pulse ring. The pulse ring is also known to a person skilled in the art as a pole wheel. The exciter is arranged between the brake disc and the flange side of the brake carrier. In order to detect the pulse ring, the speed sensor is arranged on one of the holding fixtures of the brake carrier. The holding fixture can also include an additional extension adapted for the speed sensor, so that the speed sensor is located as close as possible to the vehicle axle and the pulse ring can be designed to be smaller in terms of its outer circumference. The extension designed for the speed sensor can be integrally formed directly onto the recess of the brake carrier as a casting during the casting operation of the brake carrier.

In one embodiment, a disc brake comprises a brake carrier and a sliding saddle, which is axially displaceable in the direction of a brake disc. The disc brake also includes a fastening device, wherein the fastening device has a holding fixture formed in the brake carrier. A speed sensor of the fastening device is at least partially arranged in the holding fixture.

In one embodiment, a vehicle comprises a vehicle axle and a disc brake arranged on the vehicle axle, wherein the disc brake includes a fastening device and the fastening device has a speed sensor and a holding fixture formed in a brake carrier of the disc brake for the arrangement of the speed sensor. Any vehicle axle designed with a disc brake can include a fastening device having a speed sensor, wherein the speed sensors transmit the detected wheel speeds to a control unit for the precise determination and evaluation of all wheel speeds.

With the data of the speed sensors, among other things, anti-lock braking systems (ABS systems) are regulated, which stabilize the vehicle and minimize the wear of the vehicle tires.

BRIEF DESCRIPTION OF THE DRAWINGS

Selected exemplary embodiments of the invention are explained in the following with reference to the attached figures, wherein.

DETAILED DESCRIPTION

Figure 1:
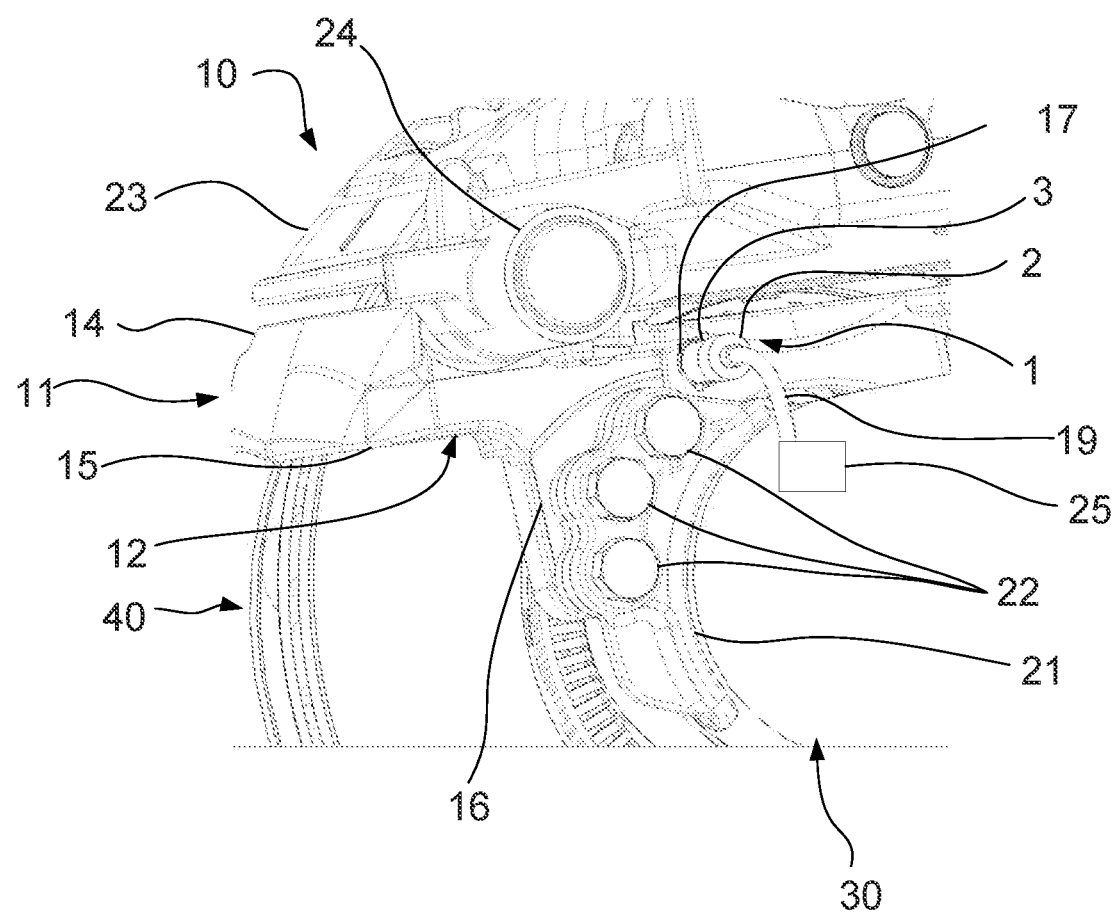
FIG. 1 shows a partial section of a disc brake having a fastening device on a brake carrier of the disc brake, according to an aspect of the present disclosure.
Figure 2:
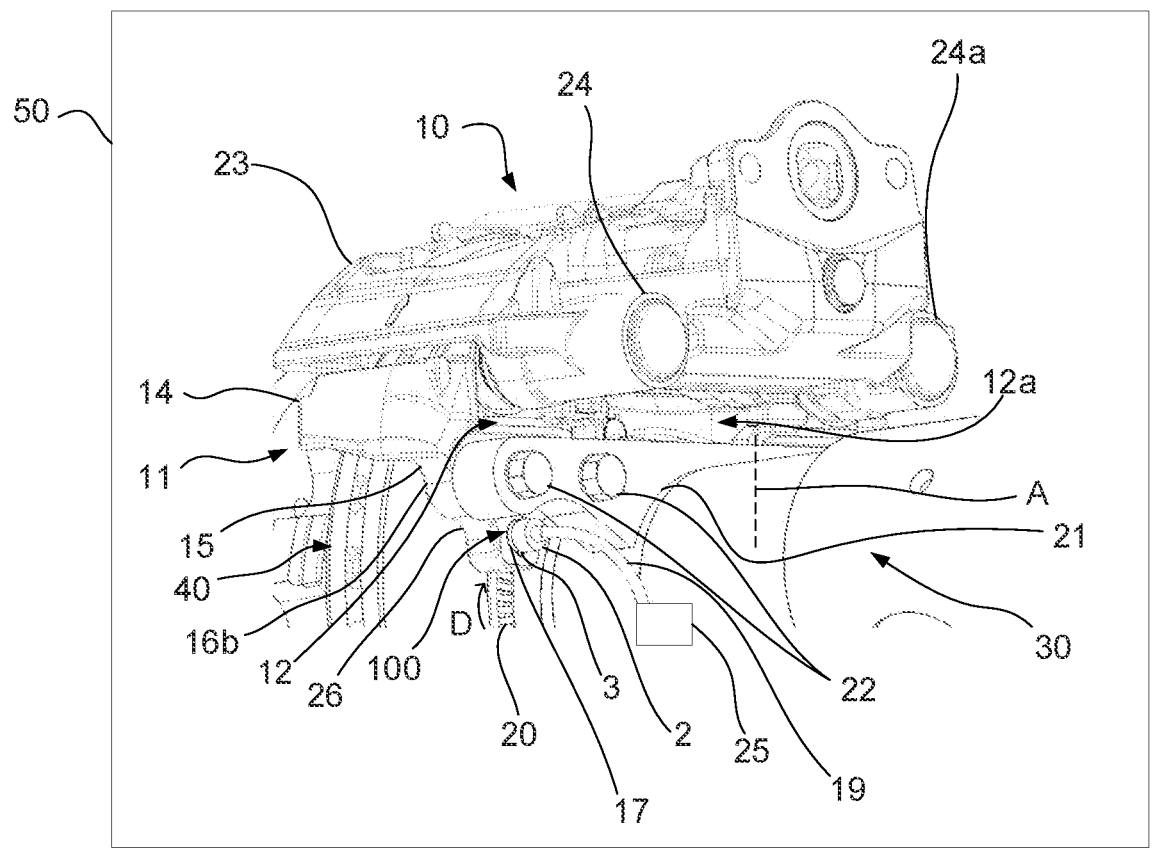
FIG. 2 shows a vehicle including a vehicle axle having a disc brake arranged thereon, including a fastening device on a brake carrier according to FIG. 1 in a second embodiment.
Figure 3:
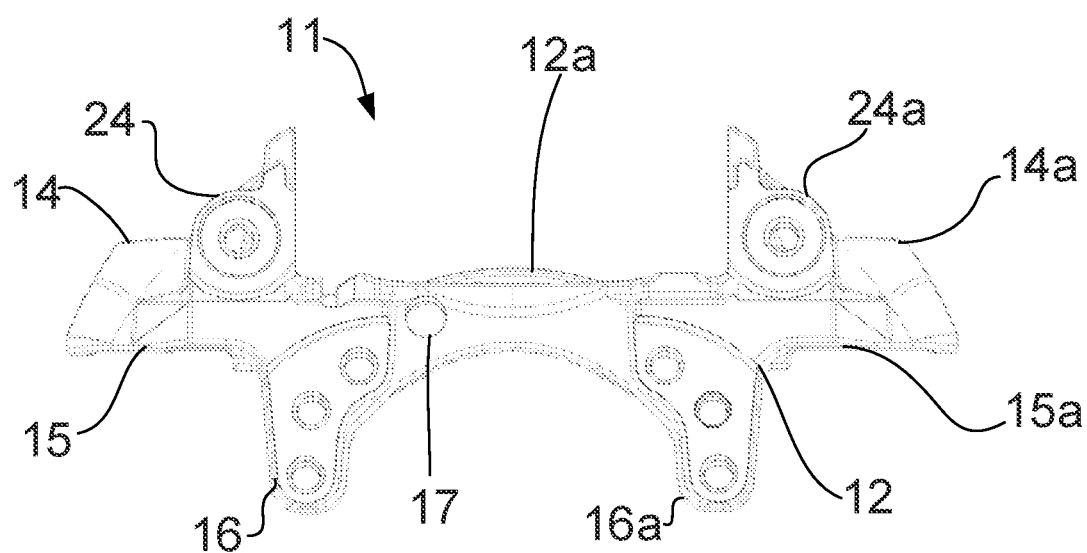
FIG. 3 shows a brake carrier according to FIG. 1 in detail.

FIG. 1 shows a partial section of a disc brake 10 having a fastening device 1 according to the present disclosure, wherein the fastening device 1 is arranged on a brake carrier 11 of the disc brake 10. The fastening device 1 includes a speed sensor 2 for detecting a wheel speed D (shown in FIG. 2). The brake carrier 11 fixes the disc brake 10 via fastening members 16, 16a (FIG. 3) onto a flange 21 of a vehicle axle 30 of a vehicle 50. The flange 21 and the fastening members 16, 16a are connected to one another via bolts 22 and secure the disc brake 10 against turning on the vehicle axle 30 and/or against a release of the disc brake 10 from the flange 21 of the vehicle axle 30. The brake carrier 11 also includes two struts 12, 12a for reinforcing the brake carrier 11. The struts 12 and 12a are shown in FIGS. 1-3. The struts 12, 12a of the fastening device 1 are arranged in parallel to a brake disc 40 positioned between the struts 12, 12a. The struts 12, 12a are connected to each other at end sections 15, 15a of the struts 12, 12a by way of two connecting elements 14, 14a, wherein the brake carrier 11 forms a frame for the brake disc 40. The speed sensor 2 is arranged on the strut 12 facing the vehicle axle 30 axially with respect to the extension direction of the vehicle axle 30. The speed sensor 2 is partially fixed in a holding fixture 17 of the strut 12 of the brake carrier 11, the holding fixture 17 being designed as a bore hole 17. The speed sensor 2 includes a clamping bush 3 for fixation in the bore hole 17. The speed sensor 2 is connected via a speed sensor cable 19 to a control unit 25 for evaluating the wheel speeds D. Moreover, a sliding saddle 23 of the disc brake 10 is shown, wherein the sliding saddle 23 is slidingly mounted on the fastening device 1 via bolt guides 24, 24a. The bolt guide 24a is shown in FIGS. 2-3.

FIG. 2 shows a vehicle 50 having the wheel axle 30 and the disc brake 10 fastened onto the wheel axle 30 and having a fastening device 100. The function of the fastening device 100 according to FIG. 2 is the same as the fastening device 1 according to FIG. 1. The fastening device 100 according to FIG. 2 differs from the fastening device 1 according to FIG. 1 due to alternatively designed fastening member 16b and the connection of the speed sensor 2 to the fastening device 100. Four bolts 22 fix the fastening device 100 via the fastening members 16b of the brake carrier 11 to the flange 21 of the vehicle axle 30. Two bolts and one fastening member (fastening member 16a) are not shown in FIG. 2. The two bolts that are not shown and the fastening member that are not shown are arranged generally as a mirror image, with respect to the shown bolts 22 and the fastening means 16b, in parallel to a radial axis A of the flange 21 of the vehicle axle 30. The speed sensor 2 is arranged, with respect to the extension direction of the vehicle axle 30, in parallel to the vehicle axle 30 on the shown fastening member 16b of the strut 12. The shown fastening member 16b includes—radially, counter to the direction of the sliding saddle 23—an extension 26 having the bore hole 17 in which the speed sensor 2 is fixed. The extension 26 having the speed sensor 2 is arranged underneath the bolts 22 of the flange 21 with respect to the sliding saddle 23, so that the speed sensor cable 19 does not need to be guided past the flange 21 and the speed sensor cable 19 is not clamped on the flange 21 during the installation of the fastening device 100. In the movement state of the vehicle 50, the wheel speed sensor 2 detects the wheel speed D or the change in wheel speed of the wheel (not shown) of the vehicle axle 30 of the vehicle 50 by way of an exciter 20 designed as a pulse ring and, thereafter, transmits the detected wheel speeds D via the speed sensor cable 19 to the control unit 25.

FIG. 3 once again shows the brake carrier 11 of the disc brake 10 from FIG. 1 in detail. In particular, the holding fixture 17 of the fastening device 1, which is designed as a bore hole 17, is visible. The bore hole 17 is introduced into the strut 12 and completely penetrates the strut 12. The bore hole 17 according to FIG. 1, as compared to the related art according to FIG. 4, nearly completely accommodates the speed sensor 2 and effectively protects the speed sensor 2 from arising heat triggered by the brake disc 40 during a brake application.

Figure 4:
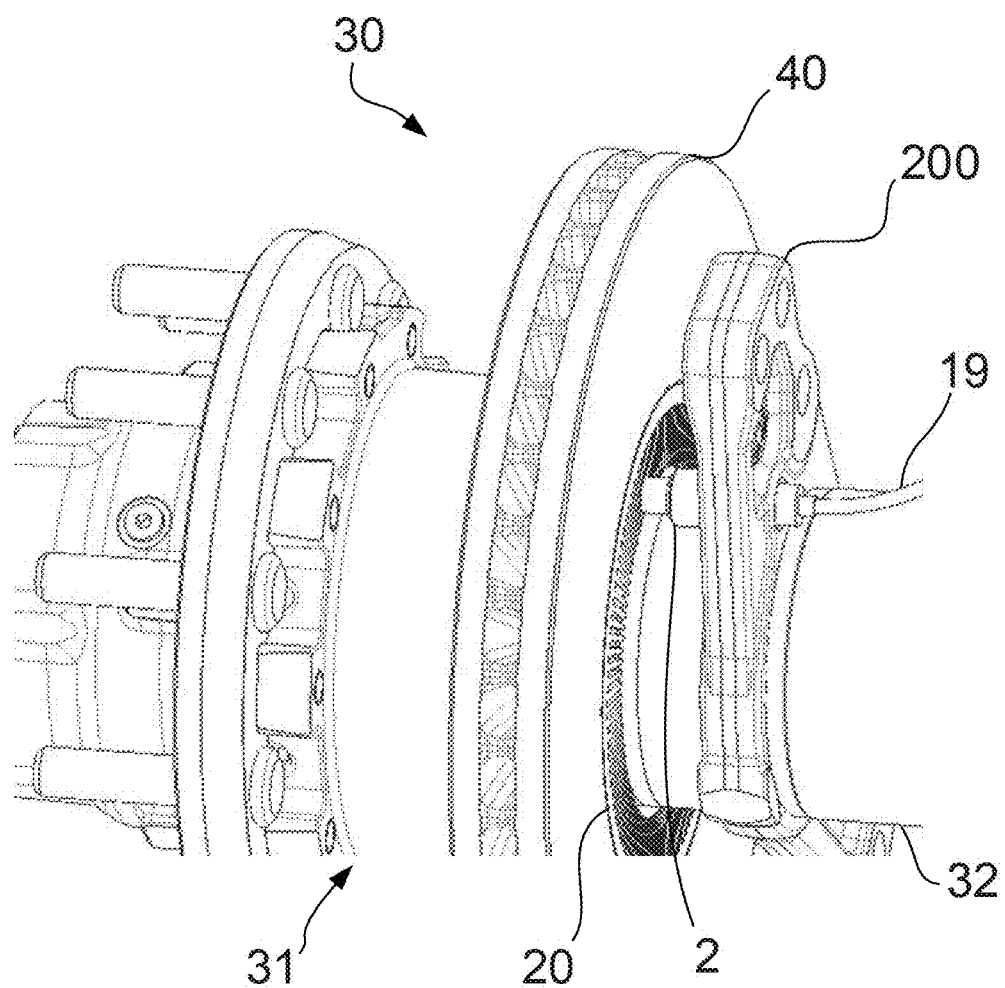
FIG. 4 shows a vehicle axle having a fastening device according to the related art.

FIG. 4 shows the vehicle axle 30 having a fastening device 200 according to the related art, in which the speed sensor 2 is instead arranged independently of the disc brake 10 (not shown in FIG. 4) via the fastening device 200 accommodated by the vehicle axle 30. The fastening device 200 in FIG. 4 is welded on a wheel suspension 32 of the vehicle axle 30 close to the axle hub 31. The speed sensor 2 is accommodated by the fastening device 200 only with the rear section of the speed sensor 2 directed toward the speed sensor cable 19. The fastening device 200 is arranged with respect to the brake disc 40 at a distance that is selected such that the speed sensor 2 is seated close to the exciter 20, which is designed as a pole wheel, and can detect the wheel speed D. The speed sensor 2 is not protected in the area of the spacing between the fastening device 200 and the brake disc 40 and, therefore, is susceptible to heat that radiates from the brake disc 40, in particular during a brake application.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

| List of reference signs (part of the description) | |
|---|---|
| 1 | fastening device |
| 2 | speed sensor |
| 3 | clamping bush |
| 10 | disc brake |
| 11 | brake carrier |
| 12, 12a | struts of the fastening device 1; 100 |
| 14, 14a | connecting elements of the fastening device |
| 15, 15a | end sections of the struts 12, 12a |
| 16-16b | fastening member of the struts 12 |
| 17 | holding fixture of the fastening device 1 |
| 19 | speed sensor cable |
| 20 | exciter of the speed sensor 2 |
| 21 | flange of the vehicle axle 30 |
| 22 | bolts of the flange 21 |
| 23 | sliding saddle |
| 24, 24a | bolt guide of the disc brake 10 |
| 25 | control unit |
| 26 | extension of the fastening member 16b |
| 30 | vehicle axle |
| 31 | axle hub of the vehicle axle 30 |
| 32 | wheel suspension of the vehicle axle 30 |
| 40 | brake disc |
| 50 | vehicle |
| 100 | fastening device according to the second exemplary embodiment |
| 200 | fastening device according to the related art |
| A | radial axis of the flange 21 of the vehicle axle 30 |
| D | wheel speed |

What is claimed is:

1. A fastening device (1, 100) for a disc brake (10) having a brake carrier (11), wherein the brake carrier (11) comprises two struts (12, 12a) arranged in parallel to a brake disc (40), wherein the struts (12, 12a) comprise, in their extension direction, two end sections (15, 15a) and the struts (12, 12a) are connected to each other at their two end sections (15, 15a) via two connecting elements (14, 14a), wherein the struts (12) each comprise fastening members (16, 16a, 16b) for flange-mounting onto a vehicle axle (30),
   wherein the fastening device (1; 100) comprises a holding fixture (17) formed in the brake carrier (11), wherein the holding fixture is configured for accommodating a speed sensor (2) for detecting a wheel speed (D).

2. The fastening device (1, 100) as claimed in claim 1, wherein the holding fixture (17) is a bore hole (17).

3. The fastening device (1, 100) as claimed in claim 2, wherein the speed sensor (2) is at least partially arranged in the bore hole (17).

4. The fastening device (1, 100) as claimed in claim 3, wherein the speed sensor (2) includes a clamping bush (3) and the speed sensor (2) is fixed in the bore hole (17) via the clamping bush (3).

5. The fastening device (1) as claimed in claim 2, wherein the bore hole is a continuous bore.

6. The fastening device as claimed in claim 2, wherein the bore hole protects the speed sensor from heat arising from the brake disc during braking.

7. The fastening device (1) as claimed in claim 1, wherein the speed sensor (2) is arranged, in its extension direction, axially toward the brake disc (40), on the strut (12) facing the vehicle axle (30).

8. The fastening device (1) as claimed in claim 7, wherein the speed sensor (2) is configured for detecting the wheel speed (D) with an exciter (20) arranged on the brake disc (40) or with an exciter (20) arranged in the brake disc (40).

9. The fastening device (100) as claimed in claim 1, wherein the speed sensor (2) is arranged, in its extension direction, axially toward the brake disc (40), on an extension (26) of a fastening member (16b) of the brake carrier (11).

10. The fastening device (1) as claimed in claim 9, wherein the speed sensor (2) is configured for detecting the wheel speed (D) with an exciter (20) on the vehicle axle (40), wherein the exciter is a pulse ring.

11. The fastening device as claimed in claim 9, wherein the extension is integrally formed with the brake carrier.

12. The fastening device as claimed in claim 1, wherein the speed sensor is connected to a controller via a cable, wherein the cable does not extend past a flange of the vehicle.

13. A disc brake (10) comprising:
a brake carrier (11) and
a sliding saddle (23) slidingly mounted on the brake carrier (11), and
a fastening device (1, 100),
wherein the brake carrier (11) includes two struts (12, 12a) arranged in parallel to a brake disc (40), wherein the struts (12, 12a) include, in their extension direction, two end sections (15, 15a) and the struts (12, 12a) are connected to each other at their two end sections (15, 15a) via two connecting elements (14, 14a), wherein the struts (12) each comprise fastening portions (16, 16a, 16b) for flange-mounting onto a vehicle axle (30),
wherein the fastening device (1, 100) comprises a holding fixture (17) formed in the brake carrier (11), wherein the holding fixture is configured for accommodating a speed sensor (2) for detecting a wheel speed (D).

14. The disc brake of claim 13, wherein the holding fixture is a bore formed in the strut facing the vehicle axle.

15. The disc brake of claim 14, further comprising a speed sensor arranged at least partially in the bore and axially aligned with an exciter associated with the brake disc or the vehicle axle for detecting the wheel speed.

16. The disc brake of claim 13, wherein the holding fixture is a bore formed in an extension of one of the fastening portions.

17. The disc brake of claim 16, further comprising a speed sensor arranged at least partially in the bore and axially aligned with an exciter for detecting the wheel speed.

18. A vehicle (50) comprising:
a vehicle axle (30) and
a disc brake (10) arranged on the vehicle axle (30),
wherein the disc brake (10) comprises:
a brake carrier (11), and
a fastening device (1, 100),
wherein the brake carrier (11) comprises two struts (12, 12a) arranged in parallel to a brake disc (40), wherein the struts (12, 12a) comprise, in their extension direction, two end sections (15, 15a) and the struts (12, 12a) are connected to each other at their two end sections (15, 15a) via two connecting elements (14, 14a), wherein the struts (12) each comprise fastening portions (16, 16a, 16b) for flange-mounting onto the vehicle axle (30),
wherein the brake carrier has an axle-side portion and an opposite-side portion disposed, such that the axle-side portion and the opposite-side portion are disposed on opposite axial sides of the brake disc, wherein the connecting elements extend axially across an axial extent of the brake disc,
wherein the fastening device (1, 100) comprises a holding fixture (17) formed in the brake carrier (11), wherein the holding fixture is configured for accommodating a speed sensor (2) for detecting a wheel speed (D),
wherein the holding fixture is disposed on the axle-side portion of the brake carrier.

19. The vehicle of claim 18, wherein the holding fixture is a bore formed in the strut facing the vehicle axle, the disc brake further comprising a speed sensor arranged at least partially in the bore and axially aligned with an exciter associated with the brake disc or the vehicle axle for detecting the wheel speed.

20. The vehicle of claim 18, wherein the holding fixture is a bore formed in an extension of one of the fastening portions, the disc brake further comprising a speed sensor arranged at least partially in the bore and axially aligned with an exciter for detecting the wheel speed.

* * * * *